(12) United States Patent
Lyu et al.

(10) Patent No.: US 7,071,540 B2
(45) Date of Patent: Jul. 4, 2006

(54) SILOXANE-BASED RESIN AND A SEMICONDUCTOR INTERLAYER INSULATING FILM USING THE SAME

(75) Inventors: Yi Yeol Lyu, Daejeon-Shi (KR); Ki Yong Song, Seoul (KR); Joon Sung Ryu, Incheon-Shi (KR); Jong Baek Seon, Gyeonggi-Do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 276 days.

(21) Appl. No.: 10/722,460

(22) Filed: Nov. 28, 2003

(65) Prior Publication Data
US 2005/0003681 A1  Jan. 6, 2005

(30) Foreign Application Priority Data
Jul. 1, 2003  (KR) .................. 10-2003-0044119

(51) Int. Cl.
*H01L 31/00*  (2006.01)
(52) U.S. Cl. ...................... 257/642; 438/623
(58) Field of Classification Search ........... 257/642, 257/759, 791; 438/623
See application file for complete search history.

(56) References Cited

U.S. PATENT DOCUMENTS

| 3,615,272 A | 10/1971 | Warde et al. |
|---|---|---|
| 4,399,266 A | 8/1983 | Matsumura et al. |
| 4,756,977 A | 7/1988 | Haluska et al. |
| 4,999,397 A | 3/1991 | Weiss et al. |
| 5,010,159 A | 4/1991 | Bank et al. |
| 5,853,808 A | 12/1998 | Arkles et al. |
| 6,000,339 A | 12/1999 | Matsuzawa |
| 6,232,424 B1 | 5/2001 | Zhong et al. |
| 6,660,822 B1 * | 12/2003 | Lyu et al. ............... 528/35 |

FOREIGN PATENT DOCUMENTS

EP  0 997 497 A1  5/2000

* cited by examiner

Primary Examiner—David Nelms
Assistant Examiner—Quoc Hoang
(74) Attorney, Agent, or Firm—Harness, Dickey & Pierce, P.L.C.

(57) ABSTRACT

A siloxane-based resin having a novel structure and a semiconductor interlayer insulating film using the same. The siloxane-based resins have a low dielectric constant in addition to excellent mechanical properties and are useful materials in an insulating film between interconnect layers of a semiconductor device.

11 Claims, No Drawings

SILOXANE-BASED RESIN AND A SEMICONDUCTOR INTERLAYER INSULATING FILM USING THE SAME

BACKGROUND OF THE INVENTION

This non-provisional application claims priority under 35 U.S.C. § 119(a) from Korean Patent Application No. 2003-44119 filed on Jul. 1, 2003, the subject matter of which is herein incorporated by reference.

1. Field of the Invention

The present invention generally relates to siloxane-based resins and semiconductor interlayer insulating films using the same. More specifically, the present invention is directed to siloxane-based resins having a new structure, which is used to prepare a semiconductor interlayer insulating film.

2. Description of the Related Art

As the circuit density of multilevel integrated circuit devices increases, the performances of devices come to depend on a line rate. So, it needs reducing the capacitances of interlayer insulating films of the devices revealed methods to decrease the resistance and capacity of the line. Specifically, U.S. Pat. Nos. 3,615,272; 4,399,266; 4,756,977 and 4,999,397 disclose the formation of insulating films by the SOD (spin on deposition) method using polysilsesquioxanes having a dielectric constant of 2.5–3.1 as well as good planarization properties.

The hydrosilsesquioxanes as well as preparation methods thereof are well known in the art. For example, U.S. Pat. No. 3,615,272 discloses a method of preparing a completely condensed, soluble hydrogensilsesquioxane resin, which comprises the steps of condensing trichlorosilanes in a sulfuric acid medium and washing the resulting resin with water or aqueous sulfuric acid. Also, U.S. Pat. No. 5,010,159 discloses a method of synthesizing a soluble condensed hydridosilicon resin, which includes the steps of hydrolyzing hydridosilanes in an arylsulfuric acid hydrate-containing a hydrolysis medium and contacting the resulting resin with a neutralizing agent. U.S. Pat. No. 6,232,424 describes a highly soluble silicon resin composition having excellent solution stability, which was prepared by hydrolyzing and polycondensing tetraalkoxysilane, organosilane and organotrialkoxysilane monomers in the presence of water and a catalyst. U.S. Pat. No. 6,000,339 describes that a silica-based compound is useful for improving the resistance to oxygen plasma and physical properties as well as thickness of a coating film, which can be obtained through reacting a monomer selected from the group consisting of alkoxysilane, fluorine-containing alkoxysilane and alkylalkoxysilane with a titanium- or zirconium-alkoxide compound in the presence of water and a catalyst. U.S. Pat. No. 5,853,808 describes that siloxane and silsesquioxane polymers, useful for forming $SiO_2$-rich ceramic coatings, can be obtained from hydrolysis and polycondensation of organosilanes having a β-substituted alkyl group. EP 0 997 497 A1 discloses that hydrolyzation and polycondensation of a certain combination of alkoxysilanes including mono-, di-, tri-, tetraalkoxysilane and trialkoxysilane dimers can provide resinous materials for insulating films.

SUMMARY OF THE INVENTION

The present invention features the production of a siloxane-based resin having excellent mechanical properties as well as very low dielectric constant, and the formation of a low dielectric insulating film using the siloxane-based resin.

One aspect of the present invention relates to a siloxane-based resin that is prepared by hydrolyzing and condensing a silane-based monomer having a radial structure of Formula 1 and at least one monomer selected from the group consisting of the compounds of Formulas 2 to 4, in organic solvent in the presence of an acid or alkaline catalyst and water:

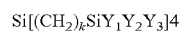
Formula 1 wherein,
k is an integer of 1–10; and
$Y_1$, $Y_2$ and $Y_3$ are independently a $C_1$–$C_3$ alkyl group, a $C_1$–$C_{10}$ alkoxy group, or a halogen atom, provided that at least one of them is hydrolysable,

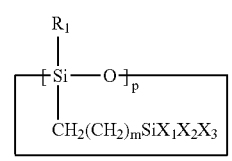
Formula 2 wherein,
$R_1$ is a $C_1$–$C_3$ alkyl group, or a $C_6$–$C_{15}$ aryl group;
$X_1$, $X_2$ and $X_3$ are independently a hydrogen atom, a $C_1$–$C_3$ alkyl group, a $C_1$–$C_{10}$ alkoxy group, or a halogen atom, provided that at least one of them is hydrolyzable;
m is an integer of 0–10; and
p is an integer of 3–8,

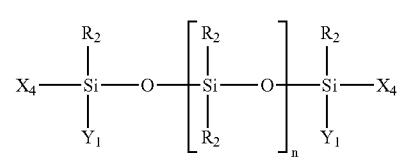
Formula 3 wherein,
$R_2$ is a $C_1$–$C_3$ alkyl group, or a $C_6$–$C_{15}$ aryl group;
$X_4$ is a hydrogen atom, or a $C_1$–$C_{10}$ alkoxy group;
$Y_1$ is a hydrogen atom, a $C_1$–$C_3$ alkyl group or a $C_1$–$C_{10}$ alkoxy group; and
n is an integer of 0–10, and

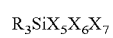
Formula 4 wherein,
$R_3$ is a $C_1$–$C_3$ alkyl group, or a $C_6$–$C_{15}$ aryl group;
$X_5$, $X_6$ and $X_7$ are independently a hydrogen atom, a $C_1$–$C_3$ alkyl group, a $C_1$–$C_{10}$ alkoxy group, or a halogen atom, provided that at least one of them is hydrolyzable.

Another aspect of the present invention relates to a method of forming a semiconductor interlayer insulating film, comprising the step of: providing a resin solution by dissolving the siloxane-based resin in an organic solvent; coating a silicon wafer with the resin solution; and heat-curing the resulting coating film.

Still another aspect of the present invention relates to an interlayer insulating film made using the above siloxane-based resin.

The present invention provides a siloxane-based resin with superior solubility through the condensation of a radial silane-based monomer of Formula 1 and at least one compound selected from the group consisting of compounds of Formulas 2 to 4.

The siloxane-based resin has a dielectric constant of 3.0 or less so that it is suitable for application as a low dielectric coating film.

Also, the present invention provides the method of preparing an insulating film by coating a silicon wafer with a solution containing the above siloxane-based resin in an organic solvent and heat-curing the resulting coating film.

According to the present invention, the combined use of a porogen with the inventive siloxane-based resin may further lower the dielectric constant of the final insulating film down to 2.50 or less. The present invention is represented by:

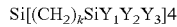

$$Si[(CH_2)_k SiY_1 Y_2 Y_3]4 \quad \text{Formula 1}$$

wherein, k is an integer of 1–10; and $Y_1$, $Y_2$ and $Y_3$ are independently a $C_1$–$C_3$ alkyl group, a $C_1$–$C_{10}$ alkoxy group, or a halogen atom, provided that at least one of them is hydrolyzable.

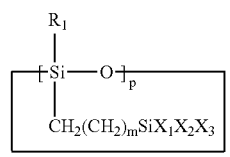

Formula 2 wherein, $R_1$ is a $C_1$–$C_3$ alkyl group, or a $C_6$–$C_{15}$ aryl group;

$X_1$, $X_2$ and $X_3$ are independently a hydrogen atom, a $C_1$–$C_3$ alkyl group, a $C_1$–$C_{10}$ alkoxy group, or a halogen atom, provided that at least one of them is hydrolyzable;

m is an integer of 0–10; and p is an integer of 3–8.

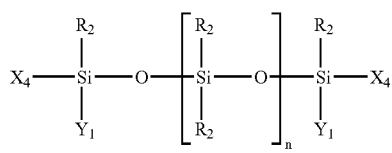

Formula 3 wherein, $R_2$ is a $C_1$–$C_3$ alkyl group, or a $C_6$–$C_{15}$ aryl group;

$X_4$ is a hydrogen atom, or a $C_1$–$C_{10}$ alkoxy group;

$Y_1$ is a hydrogen atom, a $C_1$–$C_3$ alkyl group or a $C_1$–$C_{10}$ alkoxy group; and n is an integer of 0–10, and

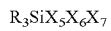

$$R_3 SiX_5 X_6 X_7 \quad \text{Formula 4}$$

wherein, $R_3$ is a $C_1$–$C_3$ alkyl group, or a $C_6$–$C_{15}$ aryl group;

$X_5$, $X_6$ and $X_7$ are independently a hydrogen atom, a $C_1$–$C_3$ alkyl group, a $C_1$–$C_{10}$ alkoxy group, or a halogen atom, provided that at least one of them is hydrolyzable.

In the preparation of the above siloxane-based resin, the monomer of Formula 1 and the monomer selected from the group consisting of the compounds represented by Formulas 2 to 4 are mixed in a molar ratio of 1:99 to 99:1.

Preferable acid or base catalysts for the preparation of the inventive siloxane-based resin can be exemplified by, but are not limited to, hydrochloric acid, nitric acid, benzene sulfonic acid, oxalic acid, formic acid, potassium hydroxide, sodium hydroxide, triethylamine, sodium bicarbonate and pyridine. Such a catalyst is used so that molar ratio of the catalyst to the monomers is 0.000001:1–10:1.

The amount of water used in the preparation of the inventive siloxane-based resin is 1–1000 mol per 1 mol of the monomers, so that molar ratio of water to the monomers is 1:1–1000:1.

Non-limiting examples of the organic solvent used in the preparation of the inventive siloxane-based resin include aliphatic hydrocarbon solvents such as hexane; aromatic hydrocarbon solvents such as anisole, mesitylene and xylene; ketone-based solvents such as methyl isobutyl ketone, 1-methyl-2-pyrrolidinone, cyclohexanone and acetone; ether-based solvents such as tetrahydrofuran and isopropyl ether; acetate-based solvents such as ethyl acetate, butyl acetate and propylene glycol methyl ether acetate; alcohol-based solvents such as isopropyl alcohol and butyl alcohol; amide-based solvents such as dimethylacetamide and dimethylformamide; silicon-based solvents; and mixtures thereof.

According to the present invention, the hydrolysis and polycondensation reaction is carried out at a temperature of 0–200° C., preferably 50–110° C., for 0.1–100 hrs, preferably 5–48 hrs.

The siloxane-based resin thus prepared has a Mw of 3,000–300,000. The Si—OR content in the entire terminal groups preferably amounts to more than 5 mol %.

The present invention also provides a method of forming an interlayer insulating film for a semiconductor device using the inventive siloxane-based resin. The insulating film has a low dielectric property below 3.0 and shows excellent mechanical and heat resistance properties. According to the present invention, such an insulating film can be obtained by coating a silicon wafer with a solution containing the inventive siloxane-based resin in an organic solvent and heat-curing the resulting coating film. That is, the inventive siloxane-based resin dissolved in an organic solvent is applied onto a substrate. Then, the organic solvent is evaporated through simple air-drying or by subjecting the substrate, at the beginning or following the heat-curing step, to a vacuum condition or to mild heating at a temperature of 200° C. or less, so that a resinous coating film can be deposited on the surface of the substrate. Thereafter, the resinous coating film is cured by heating the substrate at a temperature of 150–600° C., preferably 200–450° C., for 1–150 minutes, so as to provide an insoluble, crack-free film. As used herein, by "crack-free film" is meant a film without any cracks that can be observed with an optical microscope at a magnification of 1000×. As used herein, by "insoluble film" is meant a film that is substantially insoluble in any solvent described as being useful for dissolving the inventive siloxane-based resin.

According to the present invention, the combined use of a porogen with the inventive siloxane-based resin may further lower the dielectric constant of the final insulating film down to 2.50 or less. As used herein, by "porogen" is meant any pore-generating compounds. In case of using a porogen, an additional step is required of heating the resinous film over the decomposition temperature of the porogen so that the porogen can be decomposed.

The porogen used in the present invention may be any of the pore-generating compounds well know in the art, which can be exemplified by, but are not limited to, cyclodextrin, polycaprolactone, and derivatives thereof. The porogen is mixed in content of 1–70 wt %, based on a solid content of the siloxane-based resin.

Preferred organic solvents for the dissolution of the siloxane-based resin or the porogen to provide a liquid coating composition can be exemplified by, but are not limited to, aliphatic hydrocarbon solvents such as hexane; aromatic hydrocarbon solvents such as anisole, mesitylene and xylene; ketone-based solvents such as methyl isobutyl ketone, 1-methyl-2-pyrrolidinone, cyclohexanone and acetone; ether-based solvents such as tetrahydrofuran and isopropyl ether; acetate-based solvents such as ethyl acetate, butyl acetate and propylene glycol methyl ether acetate; alcohol-based solvents such as isopropyl alcohol and butyl alcohol; amide-based solvents such as dimethylacetamide and dimethylformamide; silicon-based solvents; and mixtures thereof.

In the preparation of the liquid coating composition, the weight ratio of solid component containing the siloxane-based resin and the porogen is preferably 5–70 wt % based on the total composition. The organic solvent should be used in an amount sufficient to apply the solid components including the siloxane-based resin and the porogen evenly to the surface of a wafer. Thus, the organic solvent should amount to 20–99.9 wt %, preferably 70–95 wt % of the liquid coating composition. If the organic solvent content of the liquid coating composition is less than 20 wt %, part of the siloxane-based resin remains undissolved. On the other hand, if the organic solvent content is more than 99.9 wt %, the final resinous film is as thin as 1000 Å or less.

In the present invention, the liquid coating composition thus prepared can be applied to a silicon wafer according to various coating methods well known in the art. Non-limiting examples of the coating method useful in the present invention include spin-coating, dip-coating, spray-coating, flow-coating and screen-printing, while spin-coating is most preferred.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Hereinafter, the present invention will be described in more detail with reference to the following Examples. However, these examples are given for the purpose of illustration only and should not be construed as limiting the scope of the present invention.

EXAMPLE 1

Synthesis of Monomer

EXAMPLE 1-1

Synthesis of Monomer (A)

Monomer (A)
$Si[CH_2CH_2SiCH_3(OCH_3)]_4$ 73.384 mmol (10.0 g) of tetravinylsilane and 0.2 g of platinum (O)-1,3-divinyl-1,1,3,3-tetramethyldisiloxane complex (solution in xylene) are introduced into a flask, and then diluted with 300 ml of tetrahydrofuran. Next, the flask is cooled to −78° C., and 322.888 mmol (37.145 g) of dichloromethylsilane is slowly added thereto, after which the reaction temperature is gradually elevated to room temperature. The reaction is continued at room temperature for 40 hours, and then volatile materials are removed from the reaction mixture under a reduced pressure of about 0.1 torr. To the reaction mixture is added with 100 ml of hexane and stirred for 1 hour, followed by filtering through celite to afford a colorless, clear solution. And then, hexane is removed from the resulting solution under a reduced pressure of 0.1 torr, to afford a liquid compound represented by the following Formula:

$Si[CH_2CH_2SiCH_3Cl_2]_4$ 16.778 mmol (10.0 g) of the above liquid compound is diluted with 500 ml of tetrahydrofuran, to which 150.999 mmol (15.28 g) of triethylamine is added. Then, the reaction temperature is cooled to −78° C., and 150.999 mmol (4.83 g) of methylalcohol is slowly added to the reaction solution, after which the reaction temperature is gradually elevated to room temperature. The reaction is continued at room temperature for 15 hrs, followed by filtering through celite, and then volatile materials are evaporated from the filtrate under reduced pressure of about 0.1 torr.

To the resulting solution is added 100 ml of hexane, and stirred for 1 hour, followed by filtering through the celite. Filtrate obtained from the filtration of the stirred solution is subjected to a reduced pressure to remove hexane therefrom and afford monomer (A) as a colorless liquid. The results obtained from NMR analysis of this monomer dissolved in CDCl₃, are as follows:

$^1$H NMR(300 MHz) data; δ 0.09 (s, 12H, 4×-CH₃), 0.48–0.54 (m, 16H, 4×—CH₂CH₂—), 3.53 (s, 48H, 4×—[OCH₃]₈)

EXAMPLE 1-2

Synthesis of Monomer (B)

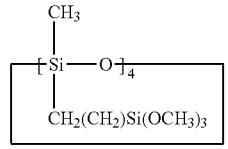

Monomer (B)

29.014 mmol (10.0 g) of 2,4,6,8-tetramethyl-2,4,6,8-tetravinylcyclotetrasiloxane and 0.164 g of platinum (O)-1,3-divinyl-1,1,3,3-tetramethyldisiloxane complex (solution in xylene) are introduced into a flask, and then diluted with 300 ml of diethyl ether. Next, the flask is cooled to −78° C., and 127.66 mmol (17.29 g) of trichlorosilane is slowly added thereto, after which the reaction temperature is gradually elevated to room temperature. At room temperature, the reaction is continued for 40 hours, and then the volatile material is removed from the reaction mixture under a reduced pressure of 0.1 torr. To the resulting solution is added 100 ml of hexane, and stirred for 1 hour, and filtered through celite. Filtrate obtained from the filtration of the stirred solution is subjected to a reduced pressure to remove hexane therefrom under a reduced pressure of 0.1 torr, to afford a liquid compound represented by the following Formula:

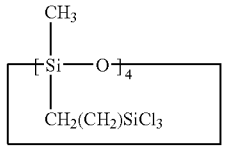

11.28 mmol (10.0 g) of the above liquid compound is diluted with 500 ml of tetrahydrofuran, to which 136.71 mmol (13.83 g) of triethylamine is added. Then, the reaction temperature is cooled to −78° C., and 136.71 mmol (4.38 g) of methylalcohol is slowly added to the reaction solution, after which the reaction temperature is gradually elevated to room temperature. The reaction is continued at room temperature for 15 hours, and the reaction solution is filtered through celite. The volatile material is removed from the reaction mixture under a reduced pressure of 0.1 torr. To the remaining filtrate is added 100 ml of hexane and stirred for 1 hr, followed by filtering through celite. To the obtained filtrate is further added 5 g of activated carbon, and stirred for 10 hours, followed by filtering through celite. From the filtrate is then removed hexane under a reduced pressure to afford a colorless liquid monomer (B). The results obtained from NMR analysis of this monomer dissolved in $CDCl_3$ are as follows:

$^1$H NMR(300 MHz) data; δ 0.09 (s, 12H, 4×—$CH_3$), 0.52–0.64 (m, 16H, 4×—$CH_2CH_2$—), 3.58 (s, 36H, 4×—[$OCH_3$]$_3$)

EXAMPLE 1–3

Synthesis of Siloxane-based Monomer (C)

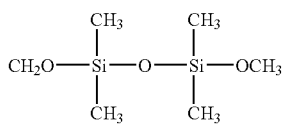

Monomer (C)

249.208 mmol (10.0 g) of 1,3-dichlorotetramethyldisiloxane is introduced into a flask, and then diluted with 500 ml of tetrahydrofuran. Next, the flask is cooled to −78° C., and 108.212 mmol (10.95 g) of triethylamine is added thereto. And then, 107.990 mmol (3.46 g) of methyl alcohol are slowly added to the flask, after which the reaction temperature is gradually elevated to room temperature. The reaction is continued at room temperature for 15 hours, and the reaction solution is filtered through celite. The volatile material is removed from the filtrate under a reduced pressure of 0.1 torr. To the remaining filtrate is added 100 ml of hexane, and stirred for 1 hour, followed by filtering through celite. And then, from the filtrate the hexane is removed under a reduced pressure to produce a colorless liquid. Colorless liquid monomer (C) is obtained from simple distillation of the liquid. The results obtained from NMR analysis of this monomer dissolved in $CDCl_3$ are as follows:

$^1$H NMR(300 MHz) data; δ 0.068(s, 12H, 4×—$CH_3$), 3.45(s, 6H, 2×—OCH3)

EXAMPLE 1–4

Synthesis of Siloxane-based Monomer (D)

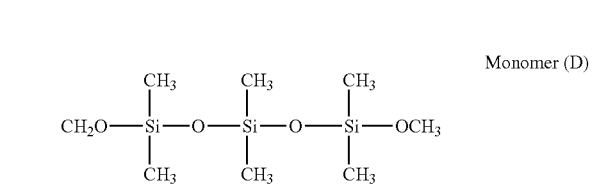

Monomer (D)

A monomer (D) is synthesized in the same manner as in Example 1–2, with the exception that 1,5-dichlorohexamethyltrisiloxane is used, instead of 1,3-dichlorotetramethyldisiloxane.

The results obtained from NMR analysis of the monomer (D) thus prepared and dissolved in $CDCl_3$ are as follows:

$^1$H NMR(300 MHz) data; δ 0.068 (s, 12H, 4×—$CH_3$), 0.077 (s, 3H, —$CH_3$), 3.44 (s, 6H, 2×—$OCH_3$)

EXAMPLE 1–5

Synthesis of Siloxane-based Monomer (E)

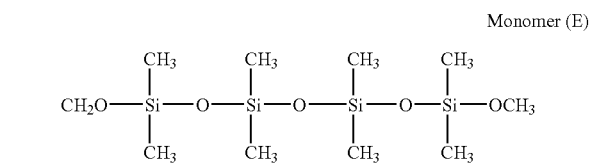

Monomer (E)

A monomer (E) is synthesized in the same manner as in Example 1–2, with the exception that 1,7-dichlorooctamethyltetrasiloxane is used, instead of 1,3-dichlorotetramethyldisiloxane.

The results obtained from NMR analysis of the monomer (E) thus prepared and dissolved in $CDCl_3$ are as follows:

$^1$H NMR(300 MHz) data; δ 0.068(s, 24H, 8×—CH3), 3.45(s, 6H, 2×—$OCH_3$)

EXAMPLE 1–6

Siloxane-based Monomer (F)

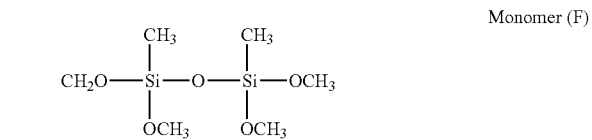

Monomer (F)

The monomer (F), purchased from Sigma. Aldrich Co., USA, is used.

EXAMPLE 1–7

Siloxane-based Monomer (G)

Monomer (G)

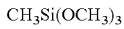

The monomer (G), purchased from Sigma. Aldrich Co., USA, is used.

EXAMPLE 2

Synthesis of Siloxane Resin

The siloxane-based monomer (A) having a radial structure connected with organic groups, and at least one monomer of the monomers (B) through (G) are placed into a flask, and diluted with tetrahydrofuran 15 times as much as the total amounts of the monomers in the flask. Then, the flask is cooled to −78° C. At −78° C., predetermined amounts of hydrochloric acid (HCl) and water are added to the flask, after which the reaction temperature is gradually elevated to 70° C. The reaction is continued at 70° C. for 20 hours. At the completion of the reaction, the reaction mixture is transferred to a separatory funnel, followed by addition of diethylether and tetrahydrofuran as much as the tetrahydrofuran used in the previous dilution of the monomer. Then, 3×washing is conducted, each round with water one tenth as much as the total solution in the separatory funnel. After washing, volatile materials are evaporated from the remaining solution to produce white powdery polymers. The powder is completely dissolved in a small amount of acetone to obtain a clear solution, and this solution is filtered through a 0.2 μm syringe filter so as to remove impurities to provide a clear filtrate, to which is then slowly added deionized water. As a result, white powdery material is formed, which is then separated from the liquid phase (mixed solution of acetone and water) and dried for 10 hrs at a temperature of 0–20° C. under a reduced pressure of about 0.1 Torr to produce a fractionated siloxane-based resin.

TABLE 1

| Siloxane Resin | Monomer (mmol) | | | | | | | HCl (mmol) | H$_2$O (mmol) | Final Resin (g) |
|---|---|---|---|---|---|---|---|---|---|---|
| | (A) | (B) | (C) | (D) | (E) | (F) | (G) | | | |
| (a) | 8.402 | 3.599 | | | | | | 0.110 | 368 | 3.45 |
| (b) | 4.798 | 4.799 | | | | | | 0.096 | 320 | 2.87 |
| (c) | 2.569 | 5.999 | | | | | | 0.098 | 308 | 2.95 |
| (d) | 10.703 | | 4.587 | | | | | 0.095 | 316 | 3.52 |
| (e) | 10.703 | | | 4.587 | | | | 0.095 | 316 | 3.46 |
| (f) | 10.703 | | | | 4.587 | | | 0.095 | 316 | 3.35 |
| (g) | 10.703 | | | | | 4.587 | | 0.104 | 578 | 3.97 |
| (h) | 12.487 | | | | | | 5.351 | 0.116 | 386 | 3.62 |
| (i) | 12.487 | | | | | | 12.487 | 0.138 | 457 | 3.56 |
| (j) | 10.703 | | | | | | 24.973 | 0.160 | 534 | 3.41 |
| (k) | 8.919 | | | | | | 80.271 | 0.312 | 1040 | 7.52 |

EXAMPLE 3

Composition Analysis

The respective siloxane-based resins obtained from the above Example 2 are analyzed for Si—OH, Si—OCH$_3$, S$_1$—CH$_3$ content, as described below. The results are set forth in Table 2.

TABLE 2

| Siloxane Resin | Si—OH (%) | Si—OCH$_3$ (%) | Si—CH$_3$ (%) |
|---|---|---|---|
| (a) | 33.9 | 2.1 | 64.0 |
| (b) | 39.2 | 1.3 | 59.5 |
| (c) | 35.7 | 0.8 | 63.5 |
| (d) | 24.9 | 1.5 | 73.6 |
| (e) | 27.1 | 1.0 | 71.9 |
| (f) | 27.5 | 1.0 | 71.5 |
| (g) | 25.9 | 0.9 | 73.2 |
| (h) | 27.7 | 6.6 | 65.7 |
| (i) | 21.5 | 5.1 | 73.4 |
| (j) | 24.9 | 4.5 | 70.6 |
| (k) | 24.3 | 2.7 | 73.0 |

Note:
Si—OH content, Si—OCH$_3$ content, and Si—CH$_3$ content were analyzed by use of a nuclear magnetic resonance analyzer(Bruker Co.), and calculated from the following equations:
Si—OH (%) = Area(Si—OH) ÷ [Area(Si—OH) + Area(Si—OCH$_3$)/3 + Area(Si—CH$_3$)/3] × 100,
Si—OCH$_3$ (%) = Area(Si—OCH$_3$)/3 ÷ [Area(Si—OH) + Area(Si—OCH$_3$)/3 + Area(Si—CH$_3$)/3] × 100,
Si—CH$_3$ (%) = Area(Si—CH$_3$)/3 ÷ [Area(Si—OH) + Area(Si—OCH$_3$)/3 + Area(Si—CH$_3$)/3] × 100.

EXAMPLE 4

Measurement of Thickness and Refractive Index of Thin Film

The siloxane-based resins obtained from the above Example 2, and their mixture with heptakis(2,3,6-tri-O-methoxy)-β-cyclodextrin are dissolved in propylene glycol methyl ether acetate (PGMEA), respectively, so that final concentration of the solid matter in the resulting liquid coating compositions is 25 wt %. Each of the coating compositions is then spin-coated onto a silicon wafer for 30 seconds while maintaining the spin rate of 3,000 rpm. In a nitrogen atmosphere, the coated wafers are subjected to the sequential soft baking on a hot plate (1 min at 100° C. and another minute at 250° C.) so as to sufficiently evaporate the organic solvent. Thereafter, the temperature is elevated to 420° C. at a rate of 3° C./min under vacuum condition, at which temperature the coating films are allowed to cure for 1 hr to produce test pieces.

Each of the test pieces thus prepared is analyzed for film thickness and refractive index. The film thickness and the refractive index are measured at 5 different points every test piece by the use of a profiler and a prism coupler, respectively. The mean thickness and refractive index are set forth in Table 3 along with their uniformity.

TABLE 3

| Siloxane Resin | Siloxane Resin (wt %) | Porogen (wt %) | Thick. (Å) | Refractive Index(R.I.) | Uniformity of R.I. (%) | Uniformity of Thick. (%) |
|---|---|---|---|---|---|---|
| (a) | 100 | — | 10230 | 1.4460 | 0.054 | 1.07 |
| (a) | 70 | 30 | 9879 | 1.3374 | 0.071 | 0.98 |
| (b) | 100 | — | 10255 | 1.4494 | 0.049 | 0.85 |
| (b) | 70 | 30 | 10030 | 1.3369 | 0.031 | 0.86 |
| (c) | 100 | — | 9876 | 1.4393 | 0.035 | 0.87 |
| (c) | 70 | 30 | 9580 | 1.3375 | 0.087 | 0.76 |
| (d) | 100 | — | 11030 | 1.4275 | 0.081 | 0.53 |
| (d) | 70 | 30 | 10090 | 1.3417 | 0.096 | 0.54 |
| (e) | 100 | — | 10200 | 1.4245 | 0.063 | 0.36 |
| (e) | 70 | 30 | 10010 | 1.3417 | 0.108 | 0.38 |
| (f) | 100 | — | 10650 | 1.4324 | 0.087 | 0.56 |
| (f) | 70 | 30 | 10030 | 1.3655 | 0.105 | 0.46 |
| (g) | 100 | — | 11200 | 1.4240 | 0.054 | 0.51 |
| (g) | 70 | 30 | 11000 | 1.3490 | 0.087 | 0.51 |
| (h) | 100 | — | 11050 | 1.4211 | 0.034 | 1.38 |
| (h) | 70 | 30 | 10060 | 1.3366 | 0.069 | 1.54 |
| (i) | 100 | — | 9980 | 1.4174 | 0.087 | 1.52 |
| (i) | 70 | 30 | 9750 | 1.3371 | 0.116 | 1.48 |
| (j) | 100 | — | 11020 | 1.4145 | 0.041 | 1.20 |
| (j) | 70 | 30 | 10200 | 1.3317 | 0.068 | 0.97 |
| (k) | 100 | — | 10135 | 1.4077 | 0.079 | 1.02 |
| (k) | 70 | 30 | 9980 | 1.3371 | 0.094 | 0.97 |

EXAMPLE 5

Measurement of Dielectric Constant

P-type silicon wafers doped with boron are coated with a 3000 Å thermally-oxidized silicon film, followed by sequential deposition of a 100 Å of titanium layer, a 2000 Å of aluminum layer and a 100 Å of titanium layer using a metal evaporator. On the surface of each of these wafers is formed a resinous film in the same manner as in the above Example 4. Subsequently, on the resinous film is deposited a circular electrode of 1 m diameter which consists of a 100 Å-thick titanium layer and a 5000 Å-thick aluminum layer through a hard mask so as to provide a test piece having a MIM (metal-insulator-metal) structure. Test pieces thus prepared are subjected to measurement of capacitance at 100 kHz using PRECISION LCR METER (HP4284A) with Micromanipulator 6200 probe station. Dielectric constant of each test film is calculated from the following equation, wherein "d" value was obtained by the use of an ellipsometer:

$$k = C \times d / \epsilon_0 \times A$$

wherein,
k: dielectric constant
C: capacitance
$\epsilon_0$: dielectric constant in vacuum
d: the thickness of low dielectric film
A: the contact area of electrode The calculated dielectric constants are set forth in Table 4.

TABLE 4

| Thin Film Composition | | | Dielectric |
|---|---|---|---|
| Siloxane Resin | Siloxane Resin (wt %) | Porogen (wt %) | Constant |
| (a) | 100 | — | 2.79 |
| (a) | 70 | 30 | 2.26 |
| (b) | 100 | — | 2.78 |
| (b) | 70 | 30 | 2.28 |
| (c) | 100 | — | 2.74 |
| (c) | 70 | 30 | 2.31 |
| (d) | 100 | — | 2.70 |
| (d) | 70 | 30 | 2.30 |
| (e) | 100 | — | 2.71 |
| (e) | 70 | 30 | 2.31 |
| (f) | 100 | — | 2.75 |
| (f) | 70 | 30 | 2.27 |
| (g) | 100 | — | 2.76 |
| (g) | 70 | 30 | 2.28 |
| (h) | 100 | — | 2.70 |
| (h) | 70 | 30 | 2.25 |
| (i) | 100 | — | 2.76 |
| (i) | 70 | 30 | 2.27 |
| (j) | 100 | — | 2.72 |
| (j) | 70 | 30 | 2.28 |
| (k) | 100 | — | 2.76 |
| (k) | 70 | 30 | 2.30 |

EXAMPLE 6

Measurement of Hardness and Modulus

Test pieces prepared as in the above Example 4 are analyzed for hardness and elastic modulus using Nanoindenter II(MTS Co.). The resinous film of each test piece is indented until the indentation depth reached 10% of its whole thickness. At this time, to secure the reliability of this measurement, 6 points are indented every test piece, and mean hardness and modulus are taken. The results are set forth in Table 5.

TABLE 5

| Siloxane Resin | Siloxane Resin (wt %) | Porogen (wt %) | Hardness (GPa) | Modulus (GPa) |
|---|---|---|---|---|
| (a) | 100 | — | 1.05 | 5.47 |
| (a) | 70 | 30 | 0.61 | 3.15 |
| (b) | 100 | — | 0.97 | 4.78 |
| (b) | 70 | 30 | 0.54 | 2.72 |
| (c) | 100 | — | 0.87 | 4.33 |
| (c) | 70 | 30 | 0.41 | 2.64 |
| (d) | 100 | — | 0.87 | 3.74 |
| (d) | 70 | 30 | 0.44 | 2.37 |
| (e) | 100 | — | 0.90 | 3.27 |
| (e) | 70 | 30 | 0.48 | 2.40 |
| (f) | 100 | — | 0.87 | 3.84 |
| (f) | 70 | 30 | 0.42 | 2.51 |
| (g) | 100 | — | 0.94 | 3.97 |
| (g) | 70 | 30 | 0.47 | 2.60 |
| (h) | 100 | — | 0.76 | 4.01 |
| (h) | 70 | 30 | 0.32 | 2.82 |
| (i) | 100 | — | 0.78 | 3.87 |
| (i) | 70 | 30 | 0.34 | 2.71 |
| (j) | 100 | — | 0.75 | 3.81 |
| (j) | 70 | 30 | 0.32 | 2.55 |
| (k) | 100 | — | 0.76 | 3.89 |
| (k) | 70 | 30 | 0.34 | 2.51 |

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A siloxane-based resin prepared by hydrolyzing and condensing a silane-based monomer having the structure of Formula 1, and at least one monomer selected from the group consisting of compounds of Formulas 2 to 4, in an organic solvent in the presence of an acid or alkaline catalyst and water:

$$Si[(CH_2)_k SiY_1 Y_2 Y_3]_4 \quad \text{Formula 1}$$

wherein, k is an integer of 1–10; and $Y_1$, $Y_2$ and $Y_3$ are independently a $C_1$–$C_3$ alkyl group, a $C_1$–$C_{10}$ alkoxy group, or a halogen atom, provided that at least one of them is hydrolyzable,

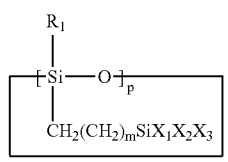

Formula 2 wherein, $R_1$ is a $C_1$–$C_3$ alkyl group, or a $C_6$–$C_{15}$ aryl group;

$X_1$, $X_2$ and $X_3$ are independently a hydrogen atom, a $C_1$–$C_3$ alkyl group, a $C_1$–$C_{10}$ alkoxy group, or a halogen atom, provided that at least one of them is hydrolyzable;

m is an integer of 0–10; and p is an integer of 3–8,

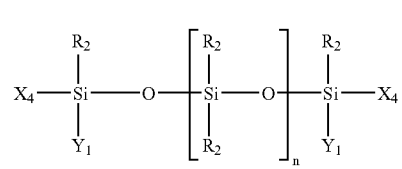

Formula 3 wherein, $R_2$ is a $C_1$–$C_3$ alkyl group, or a $C_6$–$C_{15}$ aryl group;

$X_4$ is a hydrogen atom, or a $C_1$–$C_{10}$ alkoxy group;

$Y_1$ is a hydrogen atom, a $C_1$–$C_3$ alkyl group or a $C_1$–$C_{10}$ alkoxy group; and n is an integer of 0–10, and $$R_3 SiX_5 X_6 X_7 \quad \text{Formula 4}$$

wherein, $R_3$ is a $C_1$–$C_3$ alkyl group, or a $C_6$–$C_{15}$ aryl group;

$X_5$, $X_6$ and $X_7$ are independently a hydrogen atom, a $C_1$–$C_3$ alkyl group, a $C_1$–$C_{10}$ alkoxy group, or a halogen atom, provided that at least one of them is hydrolyzable.

2. The siloxane-based resin according to claim 1, wherein the molar ratio of the monomer of Formula 1 to the monomer selected from the group consisting of compounds of Formulas 2 to 4 is 1:99 to 99:1.

3. The siloxane-based resin according to claim 1, wherein the catalyst is selected from the group consisting of hydrochloric acid, nitric acid, benzene sulfonic acid, oxalic acid, formic acid, potassium hydroxide, sodium hydroxide, triethylamine, sodium bicarbonate, pyridine, and mixtures thereof.

4. The siloxane-based resin according to claim 1, wherein the molar ratio of the monomer to the catalyst is 1:0.000001 to 1:10.

5. The siloxane-based resin according to claim 1, wherein the molar ratio of the monomer to water is 1:1 to 1:1000.

6. The siloxane-based resin according to claim 1, wherein the hydrolysis and condensation reactions are performed at 0–200° C. for 0.1–100 hours.

7. The siloxane-based resin according to claim 1, wherein the organic solvent is selected from the group consisting of an aliphatic hydrocarbon solvent, an aromatic hydrocarbon solvent, a ketone-based solvent, an ether-based solvent, an acetate-based solvent, an alcohol-based solvent, an amide-based solvent, a silicon-based solvent, and mixtures thereof.

8. The siloxane-based resin according to claim 1, wherein the weight average molecular weight of the resin is 3,000 to 300,000.

9. A semiconductor interlayer insulating film, comprising the siloxane-based resin of claim 1.

10. The semiconductor interlayer insulating film according to claim 9, wherein micropores are formed throughout the film by the use of a porogen.

11. The semiconductor interlayer insulating film according to claim 10, wherein the porogen is selected from the group consisting of cyclodextrin, polycaprolactone and derivatives thereof.

* * * * *